UNITED STATES PATENT OFFICE.

MARTIN FREUND, OF BERLIN, GERMANY.

HYDRASTININ.

SPECIFICATION forming part of Letters Patent No. 540,732, dated June 11, 1895.

Application filed February 10, 1893. Serial No. 461,810. (No specimens.)

*To all whom it may concern:*

Be it known that I, MARTIN FREUND, doctor of philosophy, a subject of the King of Prussia, and residing at Berlin, Germany, have invented a new Improvement in Hemastatics, called Hydrastinin, of which the following is a specification.

My remedy for bleeding especially uterine bleeding consists in an organic base obtained from the alkaloid "hydrastin" $C_{21}H_{21}NO_6$ by oxidation and which has been called hydrastinin.

As is well known the alkaloid hydrastin is contained in the roots of *Hydrastis Canadensis*, L. When subjected to the action of oxidizing agents such as nitric acid, ferric chlorid, oxid of manganese and sulfuric acid, chromic acid, and others, the hydrastin splits up into two compounds one of which is a base, viz: hydrastinin, while the other is an acid called opianic acid. The reaction takes place according to the following equation:

$$C_{21}H_{21}NO_6 + H_2O + O = C_{11}H_{13}NO_3 + C_{10}H_{10}O_5$$

$C_{11}H_{13}NO_3$ being the base "hydrastinin," and $C_{10}H_{10}O_5$ the opianic acid.

The hydrastinin has the structure

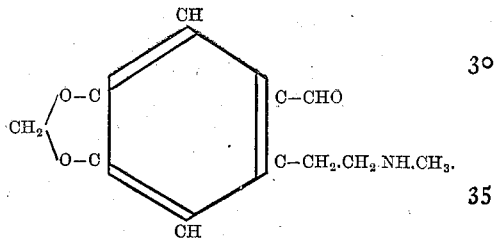

It is slightly soluble in water, but is more easily dissolved by ether and alcohol. It forms crystals which melt at 116° to 117° centigrade. Treated with an acid, it combines with one equivalent of the same. The compounds thus formed are well characterized and may be regarded as the salts of the base. These salts contain one molecule of water less than the original free base.

The salt prepared with hydrochloric acid, for instance, has the following structure:

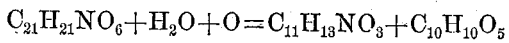
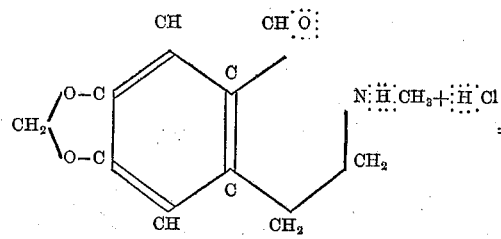
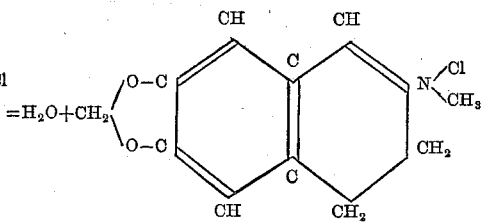

The compounds the hydrastinin forms with acids, are easily dissolved by water and for that reason more adapted for therapeutic purposes than the free hydrastinin itself.

A very advantageous way to prepare hydrastinin is as follows: One hundred parts of the alkaloid hydrastin are mixed with five hundred parts of water and four hundred parts of concentrated nitric acid are gradually added in small portions. The mixture is gently heated to from 50° to 60° centigrade; whereby the alkaloid is caused to dissolve. The reaction is complete when ammonia added to a few drops of the liquid in such proportion as to supersaturate the same, does not precipitate any undecomposed alkaloid. From the solution of hydrastinin thus obtained, the latter is precipitated by the addition of an excess of an alkali. The precipitate is filtered off, washed and finally dissolved in a determinate quantity of an appropriate mineral or organic acid, *i. e.*, hydrochloric acid or salicylic acid.

What I claim, and desire to secure by Letters Patent, is—

The new product hydrastinin hereinbefore described, having the formula $C_{11}H_{13}NO_3$, and which is slightly soluble in water, more easily in ether and alcohol; forming crystals which melt at 116° to 117° centigrade; and which when treated with an acid combines with one equivalent of the same, substantially as set forth.

In testimony whereof I have signed my name to this specification in the presence of two subscribing witnesses.

MARTIN FREUND.

Witnesses:
LEOPOLD SPIEGEL,
GEORGE B. FRANKFORTER.